Nov. 3, 1931.  E. H. WITTENBERG  1,830,415
FASTENING DEVICE FOR CAPS AND THE LIKE
Filed March 3, 1930
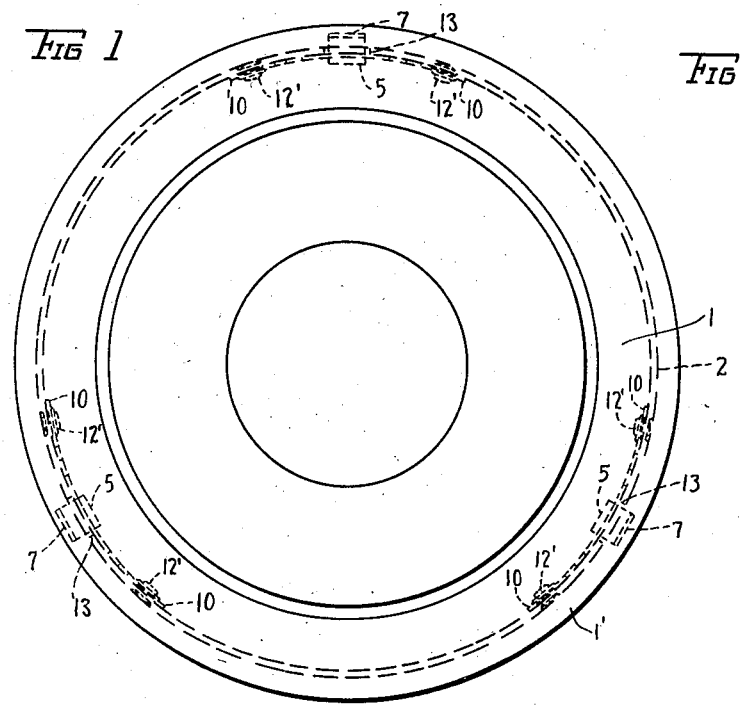
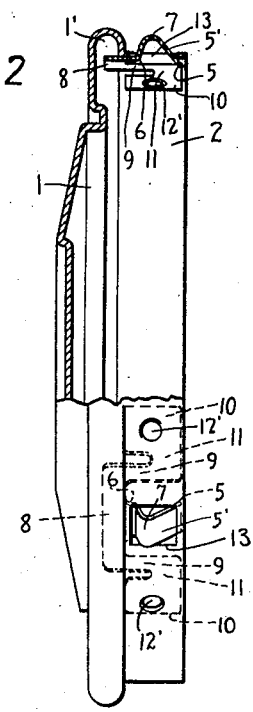
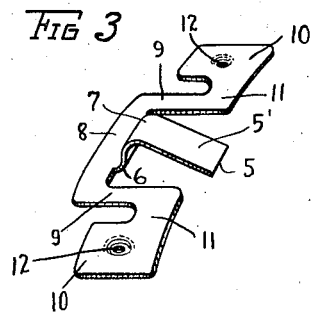
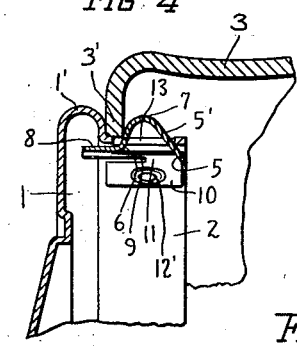
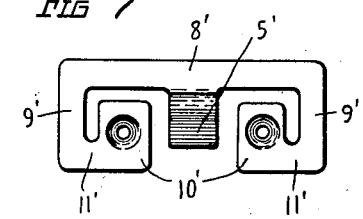
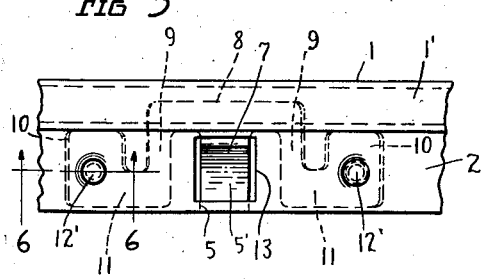
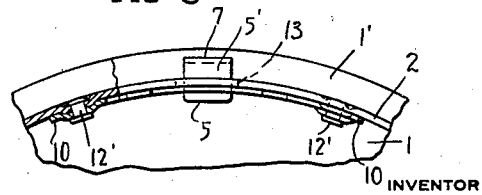
INVENTOR
Edward H. Wittenberg
BY
Staley & Welch
ATTORNEYS Patented Nov. 3, 1931

1,830,415

UNITED STATES PATENT OFFICE

EDWARD H. WITTENBERG, OF LA CROSSE, WISCONSIN, ASSIGNOR TO NORTHERN ENGRAVING COMPANY, OF LA CROSSE, WISCONSIN, A CORPORATION OF WISCONSIN

FASTENING DEVICE FOR CAPS AND THE LIKE

Application filed March 3, 1930. Serial No. 432,723.

This invention relates to fastening devices more particularly adapted for fastening closures such as vehicle hub caps, automobile radiator caps, caps for tank filler openings and the like; the invention especially relating to fastening devices for such purposes in the form of spring catches designed to automatically latch two members together in a way which will permit their ready detachment by the use of simple tools.

One of the objects of the invention is to provide a spring catch and associated parts which will be simple in construction and effective in operation.

A further and more specific object of the invention is to provide a yieldable catch which comprises a spring tongue so secured to one of the members to be latched as to allow considerable flexing of the tongue in the latching operation, but at the same time secure sufficient tension in the tongue to firmly latch the members together.

In the accompanying drawings:

Fig. 1 is a front elevation of a hub cap showing my improved fastening devices applied thereto.

Fig. 2 is a view partly in side elevation and partly in section of the cap.

Fig. 3 is an enlarged view in perspective of one of the fasteners.

Fig. 4 is an enlarged fragmentary longitudinal sectional view through a portion of a hub and its cap in which the improved features are embodied.

Fig. 5 is an enlarged fragmentary top plan of the parts shown in Fig. 4.

Fig. 6 is an enlarged fragmentary rear elevation, partly in section, the section being taken on the line 6—6 of Fig. 5.

Fig. 7 is a plan view of a modified form of the holding device.

In the particular exemplification of the invention shown in the drawings, the invention is shown applied to a vehicle hub cap, although, as before stated, it is applicable to other uses. A hub cap is indicated at 1 and is shown provided with a laterally-extending annular flange 2 which is adapted to freely fit in the bore formed by the annular inturned flange 3' of the vehicle hub 3 (Fig. 4) and be securely retained therein by the spring catches to be described, three being employed in the present case. Each spring cap is peculiarly formed in that a tongue 5 is bent sharply upward at 6 and then outwardly at 7 on a comparatively large radius, while the free end portion 5' slopes outwardly and downwardly to permit of easy engagement when being inserted in the hub.

The tongue 5 is laterally formed from a strip of spring metal, the base of the tongue being attached to a central portion 8 which connects the ends of a pair of arms 9, 9, the other ends of said arms being attached to end base portions 10 by narrow base extensions 11. In the present case the bases 10 have openings 12 to receive rivets 12' whereby the strip may be attached to the inner side of the hub cap flange 2. Rivets are preferably employed when the hub caps are made of aluminum, or zinc, but in the case of steel or brass hub caps other methods of attaching the bases to the flange may be used, such as welding.

By this arrangement, a maximum flexing of the spring tongue is permitted without danger of breakage, as it will be seen that as the tongue is depressed when being inserted in the hub, there is, in addition to the inherent flexibility of the tongue itself, a flexing of the entire structure between the base of the tongue and the bases 10 by reason of torsional stress or twisting action which is set up in the base extensions 11. By reason of the fact that the spring tongue is supported by the comparatively long arms 9, this flexing action is considerable and permits the spring tongue to be formed with a comparatively large bend near its base as shown which will afford a firm engagement with the hub. In this connection it will be noticed that the construction is such that the base extensions 11 are at one side of a line passing through the centers of the fastening holes 12 and that the arms 9 project well beyond the other side of the centers of said holes so that but a comparatively small amount of torsional stress in the base extensions 11 will permit considerable movement of the base of the spring tongue in addition to the inherent flexibility thereof.

The spring strip conforms to the contour of the inner side of the flange 2, and the flange is provided with an opening 13 to accommodate the bend of the spring tongue.

In operation, when the cap is inserted the inclined portion 5' of each of the spring tongues contacting the hub cap 3' depresses the tongue until the apex of the bend rides under the flange, after which the tongue springs to its normal position as shown in Fig. 4 to firmly lock the cap in place.

While the cap, when provided with a plurality of spring catches as described, is easily inserted in place by manual means, it is not readily removable except by the use of a tool such as a screw-driver, the blade being forced into the crevices between the bead 1' and the flange 3'. In the event it is desired to utilize the principles of the spring catch as specified for such articles as tank filler-spout caps, it is only necessary to reduce the extent to which the tongue 5 projects beyond the outer surface of the flange to provide an easily removable cap by manual means.

In Fig. 7 the form of the holding device is shown slightly modified. In this modified construction the base extensions, indicated at 11' are shown projecting in opposite directions from the base portions 10' which permits the arms, indicated at 9', to be more widely separated and furnish a greater degree of flexibility for the connecting portion 8' and the catch, indicated at 5'.

Having thus described my invention, I claim:

1. In a fastener for a pair of members to be fastened together, one of which has a flange adapted to fit into the other member, said latter member having an integral interned portion substantially at right angles thereto forming an abutment surrounding said flange, of a plurality of fastening devices each having a bent spring tongue secured to the inner side of said flange, said flange being apertured to accommodate the bent portions of said tongue to permit the same to extend beyond the outer periphery of said flange in line with said abutment.

2. In a fastener for a pair of members to be fastened together, one of which has an integral inwardly extending portion substantially at right angles thereto forming a bore and the other of which has an annular flange adapted to fit said bore, of a plurality of fastening devices each having a bent spring tongue secured to the inner face of said flange, said flange being apertured to accommodate the bent portions of said tongues to permit the same to extend beyond the outer face of said flange in line with said inwardly extending portion.

3. In a fastener of the character described, a member having a circular aperture, the wall of which has an integral inwardly extending annular flange, a cap having a laterally-extending annular flange adapted to fit in the first-mentioned flange, a plurality of fastening devices secured to the inner surface of said cap flange each having a bent spring tongue, said cap flange being apertured to accommodate the bent portions of said tongues to permit the same to extend beyond the outer periphery of said cap flange in line with the said inwardly extending flange to be initially depressed thereby and thereafter engage the inner side thereof.

4. In a fastener for a pair of members to be fastened together one of which has an abutment and the other of which supports the fastener, of a strip of spring metal consisting of a pair of separated base portions, an arm extending from each base, a central portion connecting said arms, and a bent spring tongue extending from said central portion, together with means for securing the base portions to said fastener supporting member.

5. In a fastener for a pair of members to be fastened together one of which has an abutment and the other of which supports the fastener, of a strip of spring metal consisting of a pair of separated base portions, a base extension projecting from each base portion at one side of a line drawn through the center of said base portions, an arm extending from each base extension and terminating well beyond the other side of said central line, a central portion connecting said arms, and a bent spring tongue projecting from said central portion cooperating with said abutment, together with means for connecting the end base portions to the supporting member.

6. In a fastener for a pair of members to be fastened together, one of which has an abutment and the other of which supports the fastener, of a strip of spring metal having a pair of attaching portions secured to the fastener supporting member, the intermediate portion of said strip being of U-shaped form, the legs of said U-shaped portion being secured to said attaching portions, and a spring tongue projecting from the central part of said U-shaped portion, said tongue being provided with a pronounced bend closely adjacent its point of connection with said U-shaped portion.

7. A fastener for two structures, one of which has an inturned annular flange forming a bore and the other a lateral annular flange adapted to seat in the bore consisting of a spring metal member attached at each end to the inner surface of said lateral flange, the intermediate portion of said member being so formed as to yield inwardly away from said flange under pressure, and a tongue extending from said intermediate portion having a pronounced bend near the point of connection which normally extends through an aperture in the lateral flange in the path of said inturned flange, the outer portion of said tongue being inclined.

8. A fastener for a pair of members to be fastened together, one of which has an abutment and the other of which supports the fastener, of a strip of spring metal having a pair of separated base portions adapted to be secured to the fastener supporting member, a base extension on each base portion, said base extensions projecting in opposite directions, an arm connected with each extension, said arms projecting in substantially parallel relation, a central portion connecting said arms, and a bent spring tongue extending from said central portion adapted for engagement with said abutment.

In testimony whereof, I have hereunto set my hand this 15th day of February, 1930.

EDWARD H. WITTENBERG.